(12) United States Patent
Larsen

(10) Patent No.: US 7,578,658 B2
(45) Date of Patent: Aug. 25, 2009

(54) CONTROL FOR INTEGRATING COMPRESSOR-TURBINE-MOTOR TRAIN WITH POWER GRID

(75) Inventor: Einar Vaughn Larsen, Charlton, NY (US)

(73) Assignee: General Electric Company, Schenectady, NY (US)

(*) Notice: Subject to any disclaimer, the term of this patent is extended or adjusted under 35 U.S.C. 154(b) by 813 days.

(21) Appl. No.: 10/905,991

(22) Filed: Jan. 28, 2005

(65) Prior Publication Data

US 2006/0170219 A1 Aug. 3, 2006

(51) Int. Cl.
*F04B 49/06* (2006.01)
*F02D 29/06* (2006.01)
*F01D 15/10* (2006.01)

(52) U.S. Cl. .............. 417/44.11; 290/40 B; 290/52

(58) Field of Classification Search ............... 417/44.1, 417/44.11, 374; 290/40 B, 52; 434/350
See application file for complete search history.

(56) References Cited

U.S. PATENT DOCUMENTS

| | | | | |
|---|---|---|---|---|
| 4,077,748 | A | * | 3/1978 | Potz ............... 417/319 |
| 5,635,768 | A | * | 6/1997 | Birch et al. ......... 290/40 C |
| 5,778,675 | A | | 7/1998 | Nakhamkin ......... 60/652 |
| 6,750,557 | B2 | * | 6/2004 | Poteet et al. ......... 290/52 |
| 6,794,766 | B2 | * | 9/2004 | Wickert et al. ....... 290/52 |

* cited by examiner

*Primary Examiner*—Charles G Freay
(74) *Attorney, Agent, or Firm*—Cantor Colburn LLP

(57) ABSTRACT

A method of controlling a compressor turbine motor train including: receiving a control signal from a plant process controller; receiving a feedback signal indicative of a state of the electrical grid and adjusting an operational parameter of the compressor turbine motor train to stabilize at least one of a frequency and a voltage of the electrical grid.

21 Claims, 7 Drawing Sheets

CTM Simulation on Grid,
3 × CTMs, 2 × 40MW Generators Trip One of 2 40MW Generators
with 40MW Load With (Solid) & Without (Dashed) CTM Grid Controls CTM Simulation on Grid,
3 × CTMs, 2 × 40MW Generators Trip One of 2 40MW Generators
with 40MW Load With (Solid) & Without (Dashed) CTM Load Modulator

CONTROL FOR INTEGRATING COMPRESSOR-TURBINE-MOTOR TRAIN WITH POWER GRID

BACKGROUND OF THE INVENTION

Compressor turbine motor trains are known in the art. In a typical compressor turbine motor train a compressor receives power from a motor and a turbine sharing a common shaft. The compressor power is supplied by the net output of the turbine and motor. The motor interfaces with the electric grid via a drive system. At the electrical interface, the drive exchanges both real and reactive power with the electrical grid. The voltage and frequency of the electrical grid are a function of the real and reactive power drawn by the drive. The motor can also act as a generator to transmit power to the electrical grid if the turbine capacity exceeds the compressor load.

In normal operation, a plant process controller provides a command to a compressor control system to maintain a certain discharge pressure by adjusting a speed reference to the turbine control. Speed regulation is accomplished by a turbine control system. When the turbine is firing, the fuel flow is adjusted to change turbine power and regulate speed. The drive system commands the motor to make up any torque difference that is not met by the turbine. When the turbine is not firing, the drive performs the speed regulation function with the speed command passed from the turbine control system. Typically, the turbine control system manages the coordination and commands the drive control system.

In current systems the load level is dependent upon compressor and turbine operation with no feedback or automatic control from the electric grid operating system or other means to aid stability of the electrical gird. The compressor turbine motor train system cannot rapidly respond to changes in the electrical grid that can be caused by electrical faults, load rejection, or sudden loss of power generation.

Accordingly what is needed is a control system for a compressor turbine motor train where the electrical interface to the electrical grid is adjusted under automatic control to aid operation of the electric power grid. Such a control system could be used to leverage any flexibility in real power balance between the turbine and compressor load to aid regulation of electrical grid frequency, and also to utilize any reactive control capability of the motor drive to aid regulation of electrical grid voltage.

BRIEF DESCRIPTION OF THE INVENTION

Embodiments of the invention include a method of controlling a compressor turbine motor train including: receiving a control signal from a plant process controller; receiving a power reference signal associated with a grid controller; receiving a feedback signal indicative of a state of the electrical grid; and adjusting an operational parameter of the compressor turbine motor train to stabilize at least one of a frequency and a voltage of the electrical grid.

Embodiments of the invention also include a compressor turbine motor train control system including: an electrical grid management system operable for receiving a power reference signal associated with a electrical grid, receiving a feedback signal indicative of a state of the electrical grid, and outputting one or more command signal; a compressor control system wherein the compressor control system receives a control signal from a plant process controller, receives on or more of the command signals, and outputs a speed control signal; a turbine control system wherein the turbine control system receives the speed control signal, receives one or more of the command signal, and outputs a drive command signal; a drive control system wherein the drive control system receives the drive command signal and one or more of said command signals.

Embodiments of the invention also include a method of controlling a compressor turbine motor train including: means for receiving a control signal from a plant process controller; means for receiving a power reference signal associated with an electrical grid; means for receiving a feedback signal indicative of a state of the electrical grid; and means for adjusting an operational parameter of the compressor turbine motor train to stabilize at least one of a frequency and a voltage of the electrical grid.

BRIEF DESCRIPTION OF THE DRAWINGS

These and other features, aspects, and advantages of the present invention will become better understood when the following detailed description is read with reference to the accompanying figures, wherein.

DETAILED DESCRIPTION OF THE DRAWINGS

Figure 1:
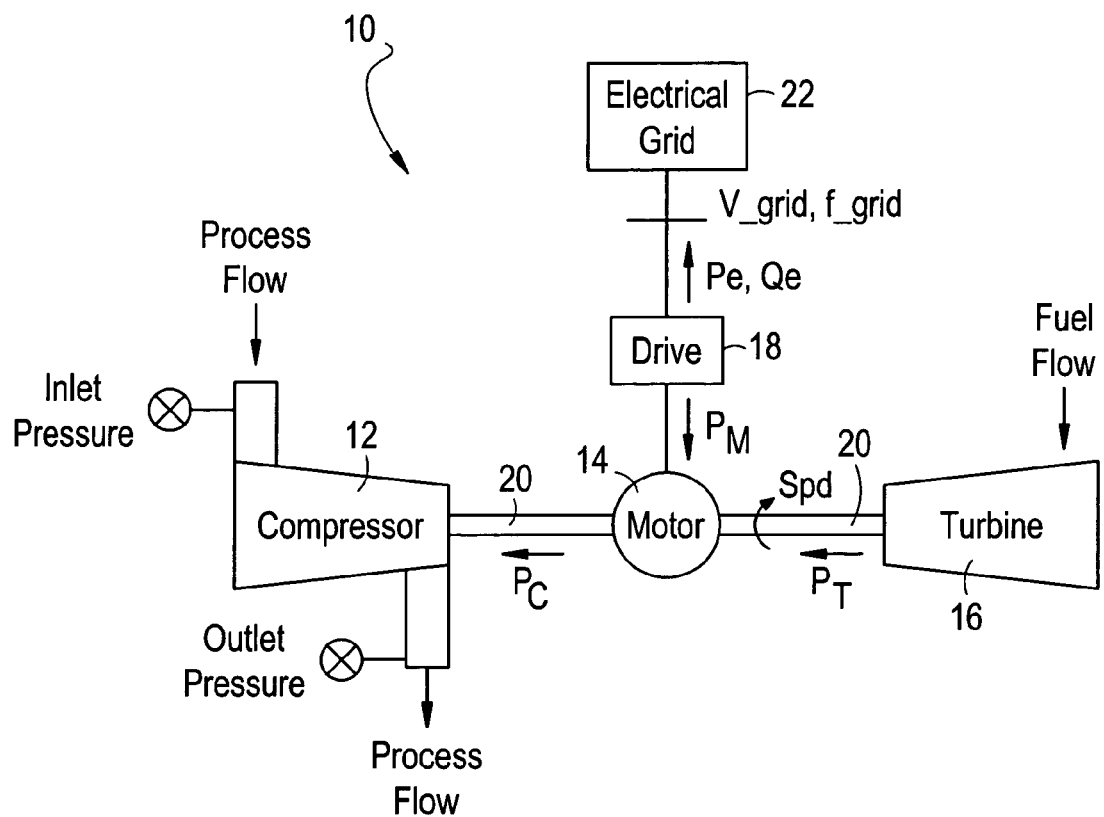
FIG. 1 is a block diagram of the configuration in a compressor turbine motor train.
Figure 2:
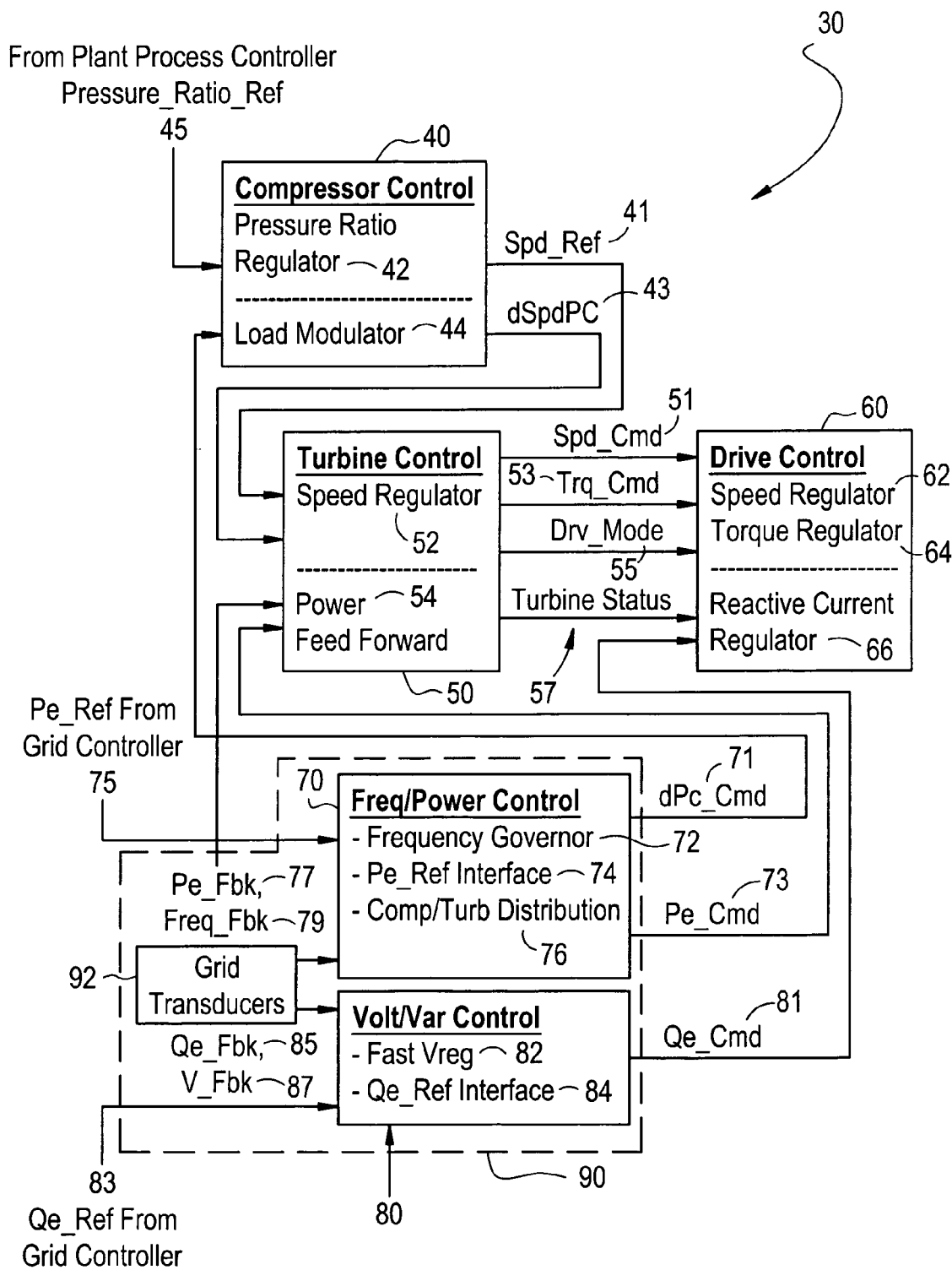
FIG. 2 is a control diagram of an exemplary embodiment of a compressor turbine motor train control system.

FIG. 1 is a block diagram of an exemplary configuration of a compressor turbine motor train 10 that may be controlled by a compressor turbine motor train control system 30, an exemplary embodiment of which is depicted in FIG. 2. The compressor turbine motor train 10 includes a compressor 12, a motor 14, a turbine 16, a drive 18, and a shaft 20. The turbine 16 is connected to the motor 14 by the shaft 20. The compressor 12 is also connected to the motor 14 by the shaft 20. The motor 14 interfaces with an electrical grid 22 through drive 18. The drive 18 exchanges both real or power between the electrical grid 22 and the motor 14. The voltage and frequency of the electrical grid 22 may be a function of the real and reactive power drawn or supplied by the drive 18. The compressor turbine motor train 10 may be used to stabilize the electrical grid 22 with respect to both rapid and steady-state regulation of frequency and voltage. However, it will be appreciated that with the compressor turbine motor train 10, there is coupling to the process as well. It is desired that this coupling be addressed to prevent disruption and limit impact on plant productivity to an acceptable level.

In an exemplary embodiment, the performance of the various elements of the compressor turbine motor train 10 are manipulated to facilitate controlling or stabilizing the electrical grid 22. In other words, any flexibility in real power balance between the turbine and compressor load is leveraged to enhance regulation of electrical grid frequency, and also to utilize any reactive control capability of the motor drive to enhance regulation of electrical grid voltage. The operational parameters of the compressor turbine motor train 10 that may be adjusted to impact the performance of the electrical grid 22 include, but are not limited to, the fuel flow into the turbine 16, the stored energy of the turbine 16, the stored energy of the compressor 12, and the energy being supplied to the process by the compressor 12. For example, in one exemplary embodiment, the compressor turbine motor train control system 30 may adjust the fuel flow, and thereby, the power output of turbine 16 while maintaining a nearly constant rotational speed of shaft 20 in reacting to changes in the voltage and/or frequency of the electrical grid 22. Alternatively, in another exemplary embodiment the compressor turbine motor train control system 30 may vary the speed of compressor 12 and leverage the stored energy of the turbine 16 and compressor 12 in reacting to changes in the voltage and/or frequency of the electrical grid 22.

An exemplary embodiment of a compressor turbine motor train control system 30, as depicted in FIG. 2, may include, but not be limited to, a compressor control system 40, a turbine control system 50, a drive control system 60, and an electrical grid management system 90. The compressor control system 40 receives one or more input signals from a plant process controller and from the electrical grid management system 90. The compressor control system 40 generates as outputs a desired speed command. The turbine control system 50 receives one or more input signals from the compressor control system 40 and from the electrical grid management system 90. The turbine control system 50 generates as outputs desired speed and torque commands directed to the drive control system 60. The drive control system 60 receives one or more input signals from the turbine control system 50 and the electrical grid management system 90. The electrical grid management system 90 receives one or more input signals from an electrical grid controller and from a grid transducer 92. The electrical grid management system 90 generates as outputs desired real and reactive power commands.

In an exemplary embodiment, the compressor control system 40 includes a pressure ratio regulator function 42 operable to regulate the pressure ratio of the compressor 12 by adjusting the speed of the compressor 12. Further, in another exemplary embodiment, the compressor control system 40 may also include a load modulator function 44 operable to vary the speed of the compressor 12 based on a power control command. The compressor control system 40 transmits one or more signals to the turbine control system 50 to set or adjust the speed of the turbine 16 responsive to the load modulator function 44.

In an exemplary embodiment, the compressor control system 40 receives a pressure ratio reference signal 45, hereinafter referred to as Pressure_Ratio_Ref signal 45, from a plant process controller indicative of a desired pressure ratio for the compressor 12. The compressor control system 40 generates and transmits a speed reference signal 41, hereinafter referred as Spd_Ref signal 41, indicative of a desired speed for the turbine 16, to the turbine control system 50. In addition, the compressor control system 40 may generate and transmit a speed change signal 43, hereinafter referred to as dSpdPC signal 43, indicative of a desired change of speed for the turbine to command adjusting the speed of the turbine 16. The compressor control system 40 may also receive a power change control command signal 71, hereinafter referred as dPC_Cmd signal 71, indicative of a requested change in the compressor power. The load modulator function 44 through the use of the dSpdPC signal 43 and the Spd_Ref signal 41 maintains the desired speed for the turbine 16 responsive to the dPC_Cmd signal 71.

Figure 3:
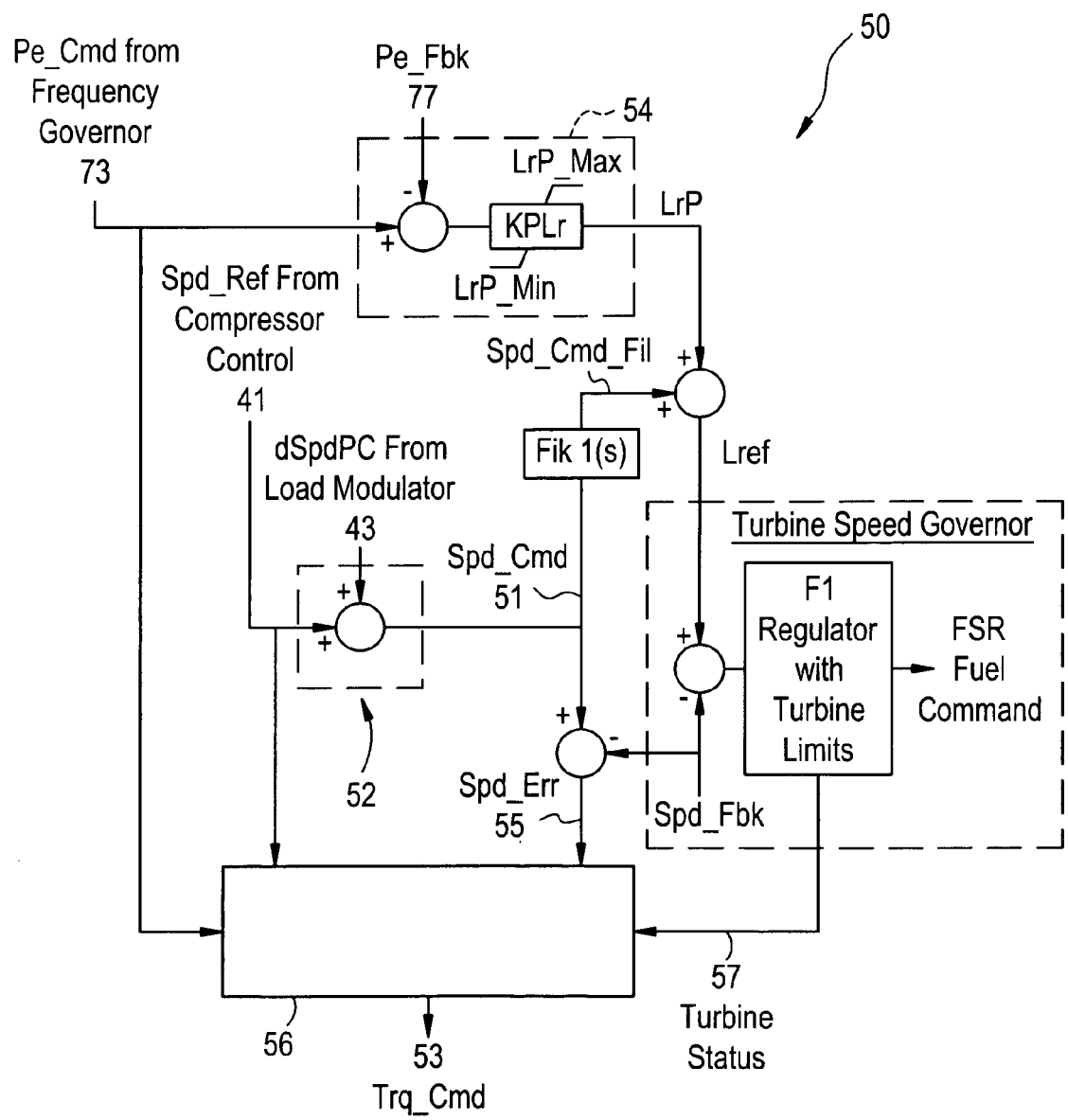
FIG. 3 is a block diagram of an exemplary embodiment of a turbine control system.

Continuing with FIG. 3, an exemplary embodiment of the turbine control system 50 includes a speed regulator function 52 operable to set and adjust the speed of the turbine 16. The turbine control system 50 also includes a power feed forward function 54 operable to adjust the power output of turbine 16 without altering the rotational speed of the shaft 20. The turbine control system 50 may receive one or more signals from the compressor control system 40 indicative of the speed of turbine 16. The turbine control system 50 may transmit one or more signals to the drive control system 60 indicative of the desired speed, or torque, and operational mode of the drive 18. In another exemplary embodiment, the turbine control system 50 may transmit a speed command signal to the drive control system 60 when the turbine 16 is operating at its limit and a torque command signal when the turbine 16 is not operating at its limit.

An exemplary embodiment of the turbine control system 50 is depicted in FIG. 3. The speed regulator function 52 receives the Spd_Ref signal 41 that is indicative of the desired nominal speed of the turbine 16 and a dSpdPC signal 43 that is indicative of a desired adjustment to the speed of the turbine 16 from the nominal speed Spd_Ref signal 41. The power feed forward function 54, commands an adjustment to the power output of turbine 16 without altering the rotational speed of the shaft 20 responsive to a real power command signal 73, hereinafter referred as Pe_Cmd signal 73. The turbine control system 50, through the power feed forward function 54 and speed regulation function 52 generates and transmits one or more drive command signals. The drive command signals include, but are not limited to, a speed command signal 51, hereinafter referred as Spd_Cmd signal 51, indicative of the speed the motor 14, a torque command signal 53, hereinafter referred as Trq_Cmd signal 53, indicative of the torque required of the drive 18 and motor 14, and a drive mode signal 55, hereinafter referred to as Drv_Mode signal 55, indicative of the mode the drive 18.

Figure 4:
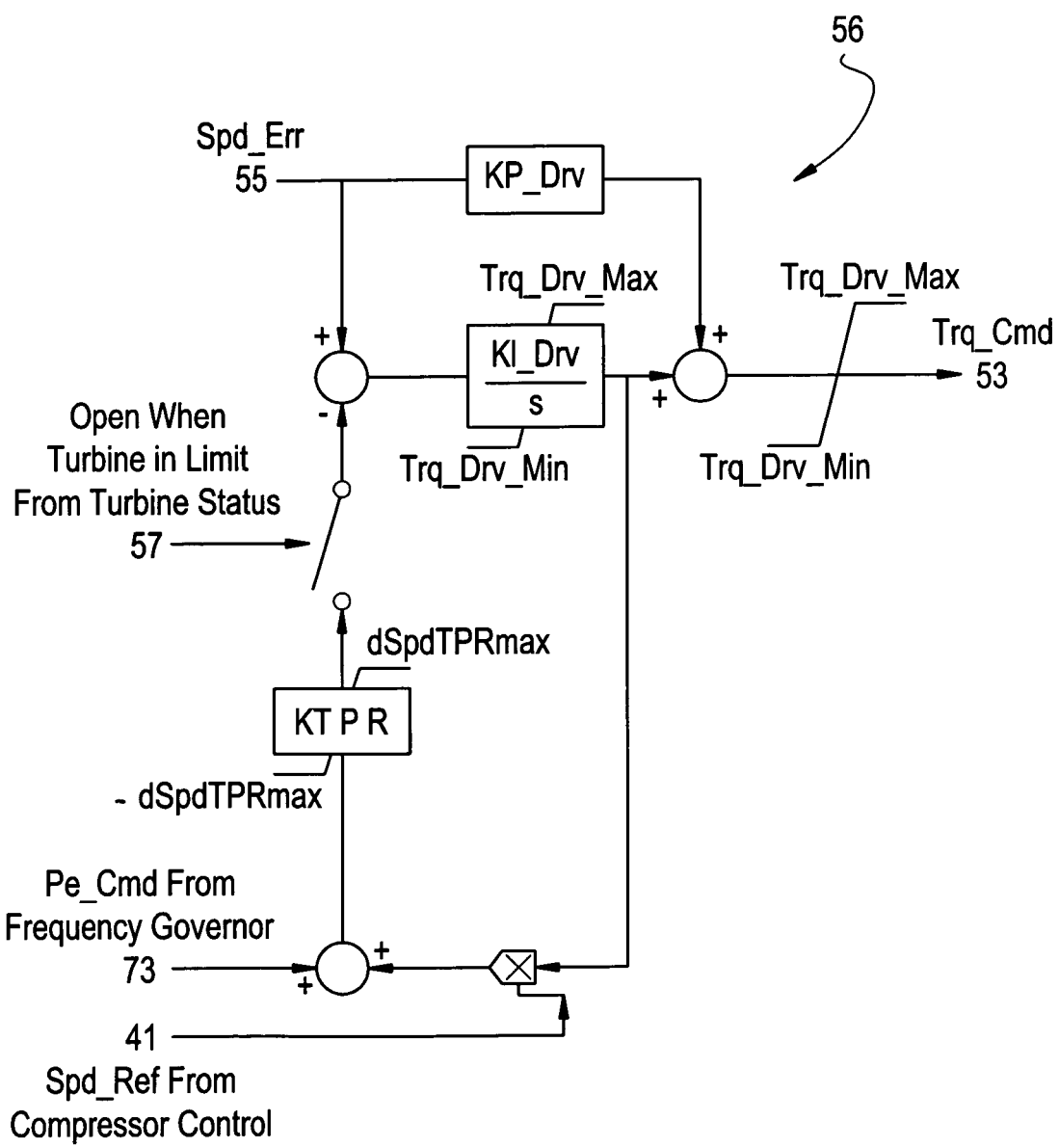
FIG. 4 is a block diagram of an exemplary embodiment of a drive torque logic control module

Turning now to FIG. 4 as well, a block diagram of an exemplary embodiment of a drive torque logic control module 56 is depicted. The drive torque control module receives a speed error signal 58, hereinafter referred to as Spd_Err signal 55, the Spd_Ref signal 41, the Pe_Cmd signal 73, and a turbine status signal 57. The drive torque control module formulates and transmits the Trq_Cmd signal 53 indicative of the torque required of the drive 18 and motor 14 responsive to the Spd_Err signal 55, the Spd_Ref signal 41, the Pe_Cmd signal 73, and a turbine status signal 57.

Continuing with FIG. 2, in an exemplary embodiment, the drive control system 60 includes a reactive current regulator function 66 operable to adjust the reactive power exchanged with the electrical grid 22. The drive control system 60 also includes a speed regulator function 62 operable to adjust the speed of the motor 14 based on Spd_Cmd signal 51 and a torque regulator function 64 operable to adjust the torque of the motor 14 based on Trq_Cmd signal 53. The drive control system 60 may use a reactive power command signal 81, hereinafter referred to as Qe_Cmd signal 81, to control the reactive current regulator function 66. The drive control system 60 receives one or more input signals including the Spd_Cmd signal 51, the Trq_Cmd signal 53, and the turbine status signal 57, which are used to control the speed, torque, and operational mode of the drive 18. The drive control system 60 implements the operational mode of the drive 18 responsive to the turbine status signal 57.

Compressor turbine motor train control system 30 includes an electrical grid management system 90 that interfaces the compressor control module 30, the turbine control module 50, and the drive control system 60 with the electrical grid 22. In an exemplary embodiment, the electrical grid management system 90 may include a frequency and power control module 70, a voltage control module 80, and one or more grid transducers 92. The grid transducers 92 are connected to the electrical grid 22 and transmit one or more feedback signals. The grid transducers 92 monitor the voltage and frequency of the electrical grid 22. Additionally, the grid transducers 92 may monitor both real and reactive power levels exchanged with the electrical grid 22. The frequency and power control module 70 and voltage control module 80 will be discussed later in further detail.

In an exemplary embodiment of the electrical grid management system 90, the grid transducers 92 transmit one or more feedback signals including a real power feedback signal 77, hereinafter referred to as Pe_Fbk signal 77, a frequency feedback signal 79, hereinafter referred to as Freq_Fbk signal 79, a reactive power feedback signal 85, hereinafter referred to as Qe_Fbk signal 85, and a voltage feedback signal 87, hereinafter referred to as V_Fbk signal 87. The Pe_Fbk signal 77 is indicative of the real power that is being exchanged between the compressor motor train 10 and the electrical grid 22, the Freq_Fbk signal 79 is indicative of the frequency of the electrical grid 22, the Qe_Fbk signal 85 is indicative of the reactive power being exchanged between the compressor motor train 10 and the electrical grid 22, and the V_Fbk signal 87 is indicative of the voltage in the electrical grid 22.

Figure 5:
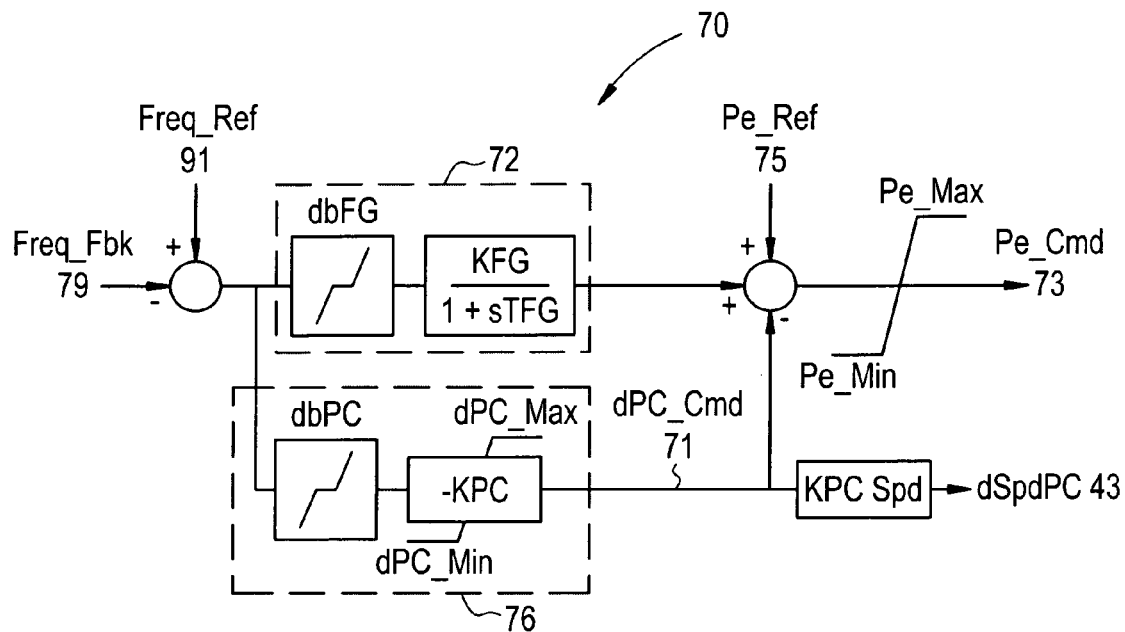
FIG. 5 is a block diagram of an exemplary embodiment of a frequency and voltage control module.

Turning now to FIG. 5 as well an exemplary embodiment of the frequency and power control module 70, which is part of the electrical grid management system 90, is depicted. The frequency and power control module 70 receives a real power reference signal 75, hereinafter referred to as Pe_Ref signal 75, a frequency reference signal 91, hereinafter referred to as Freq_Ref signal 91, and the Freq_Fbk signal 79. The frequency and power control module 70 creates commands for real power exchange with electrical grid 22 through the use of the following functions: a frequency governor function 72 and a compressor turbine distribution function 76. The frequency and power control module 70 formulates and transmits the dPC_Cmd signal 71 responsive to the compressor turbine distribution function 76 and the Pe_Cmd signal 73 responsive to the Pe_Ref signal 75 and the dPC_Cmd signal 71.

Figure 6:
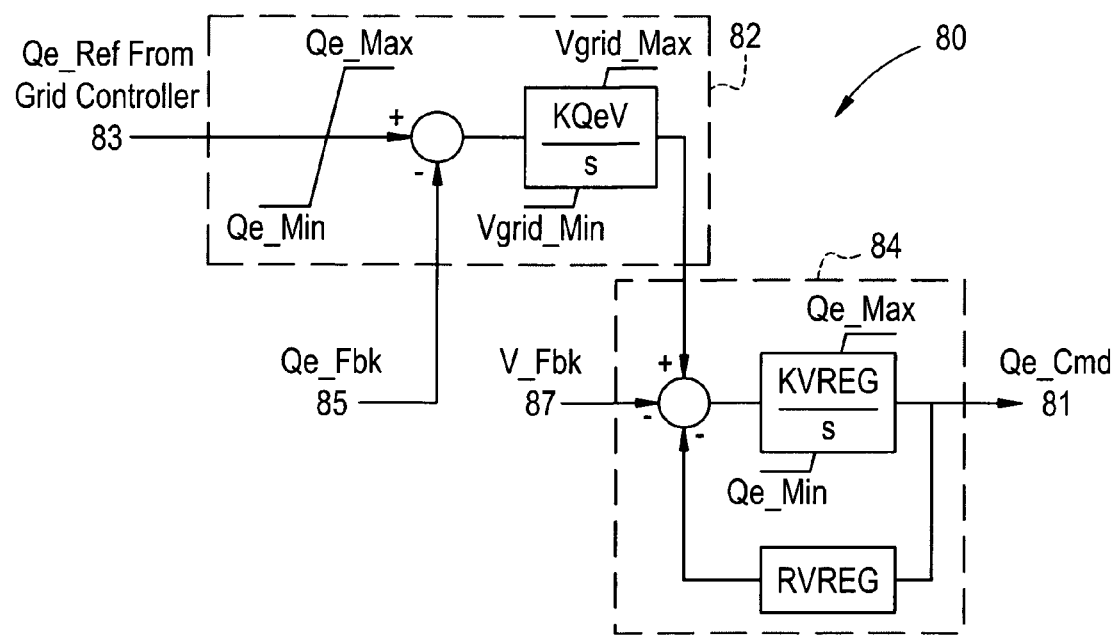
FIG. 6 is a block diagram of an exemplary embodiment of a voltage control module.

Turning now to FIG. 6 an exemplary embodiment of the voltage control module 80, of the electrical grid management system 90, is depicted. The voltage control module 80 receives a reactive power reference signal 83, hereinafter referred to as Qe_Ref signal 83, the Qe_Fbk signal 85, and the V_Fbk signal 87. The voltage control module 80 creates commands for reactive power exchange with electrical grid 22 through the use of a fast voltage regulation function 84 and a reactive power regulator 82. The voltage control module 80 transmits the Qe_Cmd signal 81 responsive to the fast voltage regulation function 84 and the reactive power regulator 82. Continuing with the voltage control module 80, the reactive power in the electrical grid 22 may be adjusted with a reactive power regulator 82, which is operable to vary the reactive power in the electrical grid 22 to that established by the grid-level controller via the fast voltage regulation function 84 and the reactive current regulator 66 or the drive control system 60.

It will be appreciated and understood that there should be limits on the amount of electrical power that can be exchanged between the drive 18 and the electrical grid 22. These limits depend upon the compressor load, ambient temperature, and other factors. These limits may be computed by the turbine control system 50 on a real-time basis. Additionally, drive torque limits may also affect the limits and may be considered in the real-time computation. Similarly, there are limits on reactive power exchange that are a function of operating conditions. The limits on real and reactive power may be coupled and therefore they preferably are computed together.

In an exemplary embodiment, the electrical grid management system 90 receives the Pe_Ref signal 75, and the Qe_Ref signal 83. The Pe_Ref signal 75 and Qe_Ref signal 83 are derived from a steady-state value sent from either a higher-level grid controller or from an operator. Optionally, one or more integrators may hold the Qe_Ref signal 83 and the Pe_Ref signal 75 which may be adjusted to track the actual power in case that the turbine 16 is operating at its limit. The Pe_Ref signal 75 may be modulated by commands from the frequency and power control module 70. Similarly, the Qe_Ref signal 83 may be modulated by commands from the voltage control module 80.

In alternative exemplary embodiment, the electrical grid management system 90 does not receive the Pe_Ref signal 75 or the Qe_Ref signal 83 from a higher-level grid controller. Rather, the electrical grid management system 90 operates the turbine at some predetermined nominal level, e.g. to maximize the output of the compressor motor train 10 in normal conditions while retaining the ability to stabilize the electrical grid 22 via locally sensed signals received from the grid transducers 92. For the example of maximizing output, this can be achieved in the disclosed scheme by setting the Pe_Ref signal 75 to a value higher than the capacity of the turbine 16, so that the turbine control system 50 will operate the turbine 16 in limit continually. This will cause the turbine status signal 57 to force the torque logic of FIG. 4 to compute drive torque 53 to satisfy the speed commands in a rapid manner, thereby enabling the operation of the load modulator function 44 to adjust speed in response to grid frequency signal 79. Similarly, for the reactive power, the Qe_Ref signal 83 might be set to zero to establish a steady-state point, while the fast voltage regulator function 84 remains in operation to ensure rapid response to disturbances on the electrical grid 22 via the voltage feedback signal 87. In this embodiment, the compressor motor train control system 30 is able to provide stabilization to the electrical grid 22 without receiving the Pe_Ref signal 75 or the Qe_Ref signal 83 from a higher-level grid controller.

Figure 7:
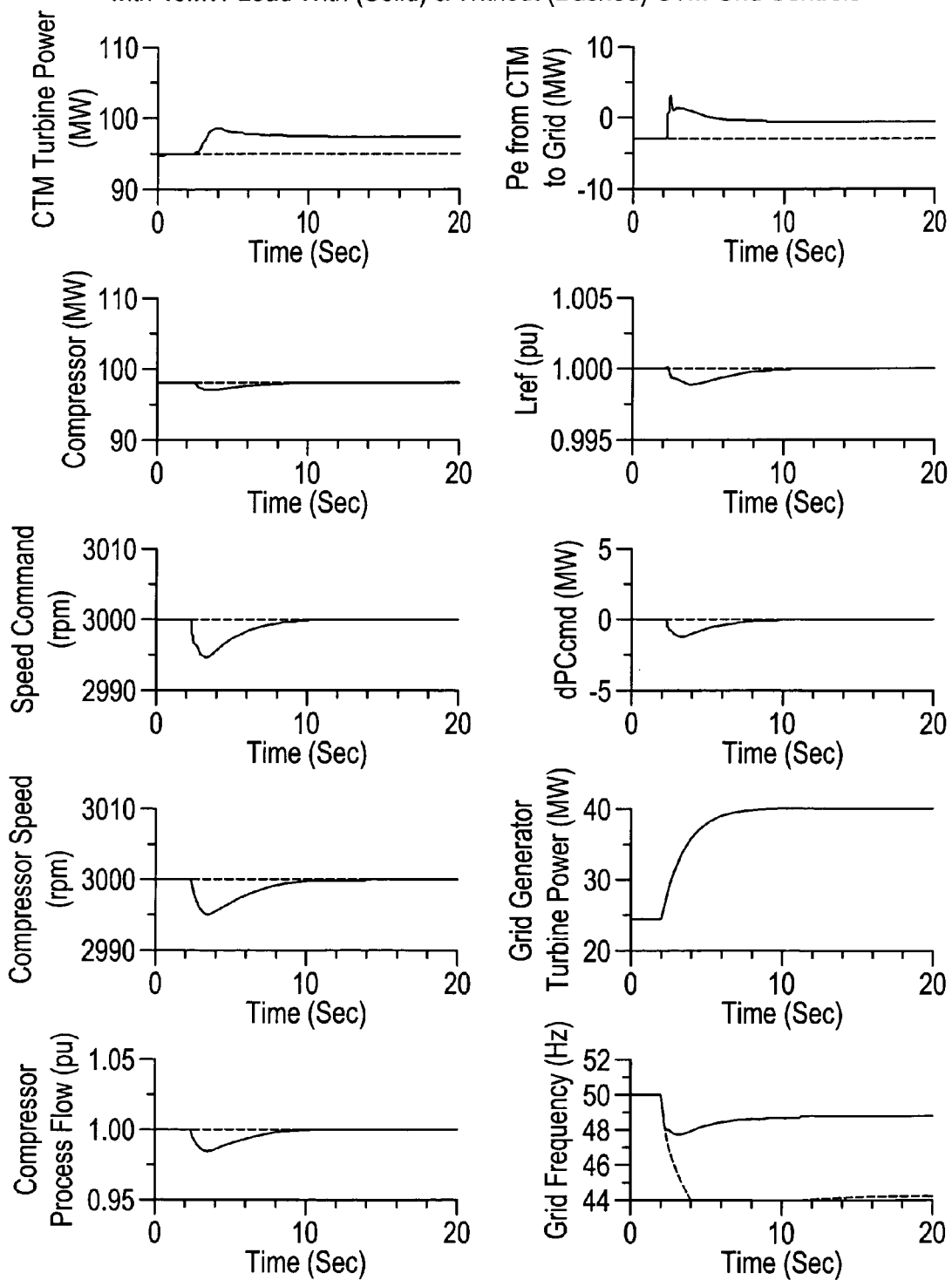
FIG. 7 is an example set of waveforms corresponding to a compressor turbine motor train with and without a control system as shown in FIG. 2.

In one system, for example, three compressor motor turbine trains 10 are connected to an electrical grid 22. The three compressor motor turbine trains 10 each have a 115 MW turbine 16, a 98 MW compressor 12, and a 60 MW motor 14. Two generators that are each rated at 40 MW supply power to the electrical grid 22. The electrical grid 22 has a load of 40 MW and a nominal frequency of 50 Hz. The electrical grid 22 is operating in steady state until one of the two 40 MW generators goes off line for some internal reason leaving only one 40 MW generator on the grid. FIG. 7 shows a comparison of the response of the electrical grid with and without the compressor motor turbine train control system 30.

As shown in FIG. 7, without the compressor motor turbine train control system 30 the frequency of the electrical grid 22 will rapidly decrease leading to a collapse of the electrical grid 22. However, with the use of the compressor motor turbine train control system 30 in accordance with an exemplary embodiment, the drop in frequency of the electric grid 22 is limited to 48 Hz with a recovery to 49 Hz within a few seconds. The speed of the reaction of the compressor motor turbine train control system 30 allows the electrical grid 22 to recover and avoid a collapse. The compressor motor turbine train control system 30 reacts within a second after the generator goes offline. Existing higher level grid controller may not react fast enough to achieve this recovery. FIG. 7 also shows that the compressor motor turbine train control system 30 response included the load modulator function 44 as well as an increase in the fuel flow to the turbine through the frequency governor function 72. The change in the dPC_Cmd signal 71 illustrates the activation of the load modulator function 44.

Figure 8:
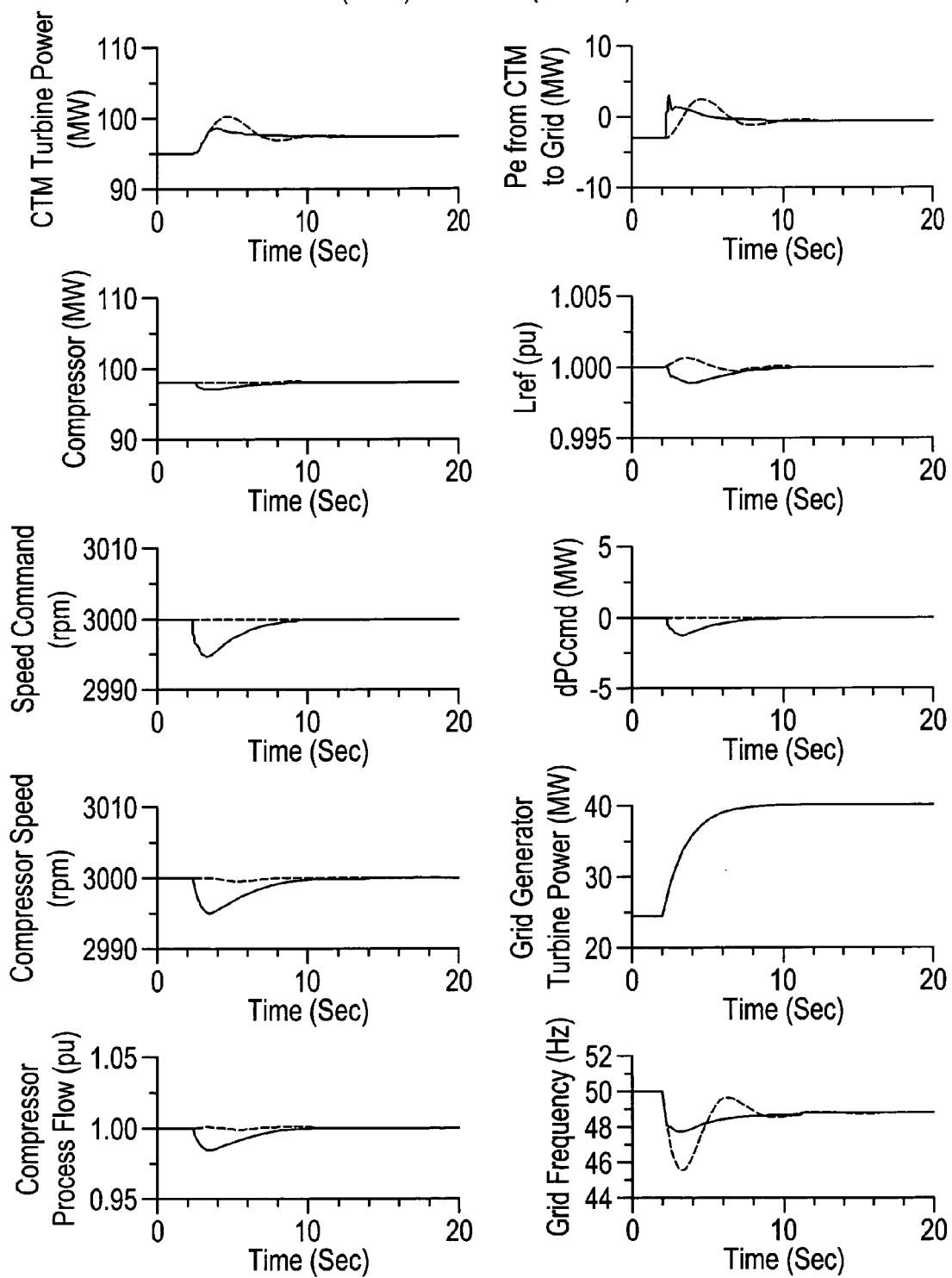
FIG. 8 is an example set of waveforms corresponding to a compressor turbine motor train having a control system as described in FIG. 2 with and without a load modulator function.

FIG. 8 depicts a comparison of a compressor motor turbine train control system 30 with and without the load modulator function 44. As shown in FIG. 8, without the load modulator function 44 the speed of compressor 12 is held virtually constant while the response of turbine 16 is contributed to the electrical grid 22. The frequency of the electrical grid 22 drops to below 46 Hz without the load modulator function 44 compared to a drop to a frequency of 48 Hz with the load modulator function 44. This additional drop in the frequency of the electrical grid 22 could lead to a collapse of the electrical grid 22.

It will be appreciated that one or more compressor motor turbine trains 10 may be connected to a single electrical grid 22. The compressor motor turbine trains 10 may share completely or partially a compressor motor train control system 30. In an exemplary embodiment, the compressor motor turbine trains 10 may share a single electrical grid management system 90 and each compressor motor turbine trains 10 may have a compressor control system 40, a turbine control system 50, and a drive control system 60.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of controlling a compressor turbine motor train, having a compressor and a turbine operatively coupled to the compressor, the method comprising:
   receiving an input signal in a compressor control system;
   receiving a feedback signal in an electrical grid management system;
   outputting a speed control signal from the compressor control system;
   outputting one or more command signals from the electrical grid management system;
   receiving the speed control signal and the one or more command signals in a turbine control system;
   receiving the one or more command signals in the compressor control system;
   outputting a drive command signal from the turbine control system;
   receiving the drive command signal and the one or more command signals in a drive control system; and
   adjusting a speed and a load of the compressor and adjusting a fuel flow into the turbine, wherein the speed and the load of the compressor and the fuel flow to the turbine are operational parameters of the compressor turbine motor train and adjustments to the speed and the load of the compressor and the fuel flow to the turbine are based on any of said input or said feedback signals to stabilize at least one of a frequency and a voltage of an electrical grid.

2. The method of claim 1 further comprising receiving a power reference signal associated with a grid controller.

3. The method of claim 1 wherein said adjusting operational parameter of the compressor turbine motor train is responsive to said input signal.

4. The method of claim 2 wherein said adjusting an operational parameter of the compressor turbine motor train is responsive to said power reference signal.

5. The method of claim 1 wherein said adjusting an operational parameter of the compressor turbine motor train is responsive to said feedback signal.

6. The method of claim 1, wherein said feedback signal comprises at least one of:
   a real power signal;
   a reactive power signal;
   a frequency signal; and
   a voltage signal.

7. The method of claim 2, wherein said power reference signal comprises at least one of a real power reference signal and a reactive power reference signal.

8. The method of claim 1 wherein said input signal is received from a plant process controller.

9. A compressor turbine motor train control system comprising:
   an electrical grid management system operable for receiving a feedback signal and outputting one or more command signal;
   a compressor control system wherein said compressor control system receives a input signal and one or more of said command signals, and outputs a speed control signal;
   a turbine control system wherein said turbine control system receives said speed control signal, receives one or more of said command signal, and outputs a drive command signal;
   a drive control system wherein said drive control system receives said drive command signal and one or more of said command signals.

10. The compressor turbine motor train control system of claim 9 wherein said electrical grid management system is operable for receiving a power reference signal associated with a electrical grid.

11. The compressor turbine motor train control system of claim 9 wherein said compressor turbine motor train control system adjusts one or more operational parameter responsive to said feedback signal.

12. The compressor turbine motor train control system of claim 10 wherein said compressor turbine motor train control system adjusts one or more operational parameter responsive to said power reference signal.

13. The compressor turbine motor train control system of claim 9 wherein said compressor turbine motor train control system adjusts one or more operational parameter responsive to said input signal.

14. The compressor turbine motor train control system of claim 9, wherein said feedback signal comprises at least one of:
   a real power signal;
   a reactive power signal;
   a frequency signal; and
   a voltage signal.

15. The compressor turbine motor train control system of claim 10, wherein said power reference signal comprises at least one of:
a real power reference signal and a reactive power reference signal.

16. The compressor turbine motor train control system of claim 9 wherein said electrical grid management system comprises:
one or more grid transducer;
a frequency and power control module; and
a voltage control module.

17. The compressor turbine motor train control system of claim 9 wherein said turbine control system comprises at least one of a speed regulator function and a power feed forward function.

18. The compressor turbine motor train control system of claim 9 wherein said compressor control system comprises at least one of a pressure ratio regulator function and a load modulator function.

19. A system for controlling a compressor turbine motor tram comprising:
a compressor control system configured to receive an input signal and one or more command signals and configured to output a speed control signal;
a compressor coupled to the compressor control system;
an electrical grid management system including configured for receiving a feedback signal and outputting the one or more command signals;
a turbine control system configured to receive the speed control signal and to output a drive command signal;
a turbine operatively coupled to the turbine control system;
an electrical grid operatively coupled to the turbine and the electrical grid management system; and
a frequency and power control module coupled to the electrical grid management system, the frequency and power control module configured to adjust a speed and a load of the compressor, and further configured to adjust a fuel flow into the turbine,
wherein the speed and the load of the compressor, and the fuel flow into the turbine are operational parameters of the compressor turbine motor train and are adjusted based on any of said input or said feedback signals to stabilize at least one of a frequency and a voltage of the electrical grid.

20. The system of claim 19 further comprising means for receiving a power reference signal associated with said electrical grid.

21. The system of claim 19 wherein said input signal is received from a plant process controller.

* * * * *